United States Patent
Oka et al.

(10) Patent No.: US 8,163,195 B2
(45) Date of Patent: Apr. 24, 2012

(54) ADDITIVES FOR ELECTROLYTE SOLUTION AND ELECTROLYTE SOLUTION

(75) Inventors: Akinori Oka, Tokushima (JP); Hiroaki Shima, Tokushima (JP); Shoji Hiketa, Tokushima (JP); Yoshinobu Abe, Tokushima (JP); Akihiro Nabeshima, Tokushima (JP); Masatoshi Uetani, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 571 days.

(21) Appl. No.: 12/308,868

(22) PCT Filed: Jun. 29, 2007

(86) PCT No.: PCT/JP2007/063524
§ 371 (c)(1),
(2), (4) Date: Dec. 24, 2008

(87) PCT Pub. No.: WO2008/001955
PCT Pub. Date: Jan. 3, 2008

(65) Prior Publication Data
US 2009/0309060 A1 Dec. 17, 2009

(30) Foreign Application Priority Data
Jun. 30, 2006 (JP) .................. 2006-182629

(51) Int. Cl.
*H01G 9/038* (2006.01)
(52) U.S. Cl. ........ 252/62.2; 361/502; 361/503; 361/504
(58) Field of Classification Search .................. 252/62.2; 361/502, 504, 503
See application file for complete search history.

(56) References Cited

U.S. PATENT DOCUMENTS

| | | | | |
|---|---|---|---|---|
| 3,663,378 A | * | 5/1972 | Brown | 205/273 |
| 3,917,686 A | * | 11/1975 | Bruson | 562/584 |
| 3,998,999 A | * | 12/1976 | De Bernardo et al. | 536/55 |
| 4,008,293 A | * | 2/1977 | Maska et al. | 525/160 |

(Continued)

FOREIGN PATENT DOCUMENTS

EP 0 948 073 10/1999

(Continued)

OTHER PUBLICATIONS

European Patent Office Search Report issued Jun. 30, 2010 in corresponding European Application No. 07 76 8258.

(Continued)

*Primary Examiner* — Carol M Koslow
(74) *Attorney, Agent, or Firm* — Wenderoth, Lind & Ponack, L.L.P.

(57) ABSTRACT

An additive of the formula (1) for use in electrolytic solutions

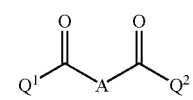

(1)

wherein A is —CH(X)— or —C═C(X)—, X being hydrogen, halogen, alkyl having 1 to 4 carbon atoms, alkoxycarbonyl having 2 to 5 carbon atoms, benzoyl or alkoxycarbonylalkyl having 3 to 9 carbon atoms, $Q^1$ and $Q^2$ are the same or different and are each alkyl having 1 to 6 carbon atoms, alkoxyl having 1 to 4 carbon atoms, alkoxycarbonylalkyl having 3 to 9 carbon atoms or amino having as a substituent alkyl having 1 to 4 carbon atoms, and A, $Q^1$ and $Q^2$ may form a ring structure.

1 Claim, 1 Drawing Sheet

U.S. PATENT DOCUMENTS

| | | | |
|---|---|---|---|
| 4,087,539 A * | 5/1978 | Muchowski et al. | 514/413 |
| 4,113,740 A * | 9/1978 | Cohen et al. | 549/453 |
| 7,436,651 B2 | 10/2008 | Takeda et al. | |
| 7,695,863 B2 * | 4/2010 | Abe et al. | 429/200 |
| 2007/0002522 A1 | 1/2007 | Takeda et al. | |

FOREIGN PATENT DOCUMENTS

| | | | |
|---|---|---|---|
| JP | 2002-367674 | * | 12/2002 |
| JP | 2003-163139 | | 6/2003 |
| JP | 2004-221557 | | 8/2004 |
| JP | 2005-285377 | | 10/2005 |
| JP | 2005-347222 | * | 12/2005 |
| JP | 2006-13271 | | 1/2006 |
| JP | 2006-156728 | * | 6/2006 |
| JP | 2007-043105 | | 2/2007 |
| WO | WO 2006/070546 | * | 7/2006 |

OTHER PUBLICATIONS

International Search Report issued Sep. 27, 2007 in the International (PCT) Application of which the present application is the U.S. National Stage.

* cited by examiner

ADDITIVES FOR ELECTROLYTE SOLUTION AND ELECTROLYTE SOLUTION

This application is a U.S. national stage of International Application No. PCT/JP2007/063524 filed Jun. 29, 2007.

TECHNICAL FIELD

The present invention relates to electrolytic solutions wherein formation of OH ions is inhibited even in the event of electrochemical alteration to diminish the degradation or corrosion of resins, rubbers or metals and to give improved reliability to electrochemical devices, the invention also relating to electrochemical devices wherein the electrolytic solution is used.

BACKGROUND ART

With electrochemical devices such as electric double layer capacitors, a very small amount of water in the electrolytic solution is reduced along with oxygen when voltage is applied to the device, generating $OH^-$ ions in the vicinity of the negative electrode. These $OH^-$ ions cause corrosion to the sealed opening portion of the negative electrode, entailing a solution leak and leading to the problem of lowering the reliability of the electrochemical device.

In the case where the cation is a quaternary ammonium salt, it is impossible to inhibit the formation of $OH^-$ ions, but it has been disclosed to effectively diminish the alkali produced by using an amidine electrolyte as means for solving such a problem (e.g., Patent Literatures 1 and 2).

According to Patent Literatures 1 and 2, electrolytic solutions comprising an amidine electrolyte are usable without giving rise to trouble such as solution leaks due to the degradation of sealing rubber during constant-voltage electrolysis unlike the quaternary ammonium salt conventionally used as an electrolyte, effectively reducing the amount of alkali. However, electrolytic solutions wherein an amidine electrolyte is used are generally lower in voltage resistance than quaternary ammonium salts and therefore have the problem of encountering difficulties in providing electrochemical devices of higher capacitance.

[Patent Literature 1] WO 95/15572
[Patent Literature 2] JP1996-321439A

An object of the present invention is to provide electrolytic solutions wherein formation of $OH^-$ ions is inhibited even in the event of electrochemical alteration to diminish the degradation or corrosion of resins, rubbers or metals and to give improved reliability to electrochemical devices, and to further provide electrochemical devices wherein the electrolytic solution is used.

DISCLOSURE OF THE INVENTION

The present invention provides the following inventions.
1. An additive of the formula (1) for use in electrolytic solutions

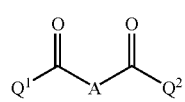

(1)

wherein A is —CH(X)— or —C=C(X)—, X being hydrogen, halogen, alkyl having 1 to 4 carbon atoms, alkoxycarbonyl having 2 to 5 carbon atoms, benzoyl or alkoxycarbonylalkyl having 3 to 9 carbon atoms, $Q^1$ and $Q^2$ are the same or different and are each alkyl having 1 to 6 carbon atoms, alkoxyl having 1 to 4 carbon atoms, alkoxycarbonylalkyl having 3 to 9 carbon atoms or amino having as a substituent alkyl having 1 to 4 carbon atoms, and A, $Q^1$ and $Q^2$ may form a ring structure.

2. An electrolytic solution containing an electrolyte and an additive of the formula (1).

BEST MODE OF CARRYING OUT THE INVENTION

The electrolytic solution of the present invention contains an additive of the formula (1).

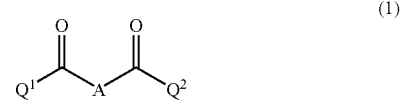

(1)

The groups represented by A are —CH(X)— and —C=C(X)—.

X is a halogen atom such as hydrogen, fluorine, chlorine, bromine and iodine; straight-chain, branched or cyclic alkyl having 1 to 4 carbon atoms such as methyl, ethyl, propyl and butyl; alkoxycarbonyl having 2 to 5 carbon atoms such as methoxycarbonyl, ethoxycarbonyl and butoxycarbonyl; benzoyl; alkoxycarbonylalkyl having 3 to 9 carbon atoms such as methoxycarbonylmethyl, ethoxycarbonylmethyl, butoxycarbonylmethyl, methoxycarbonylethyl, ethoxycarbonylethyl, butoxycarbonylethyl, methoxycarbonylbutyl, ethoxycarbonylbutyl and butoxycarbonylbutyl. Preferable is alkoxycarbonyl having 2 to 5 carbon atoms.

The groups represented by $Q^1$ and $Q^2$ are same or different and are straight-chain, branched or cyclic alkyl having 1 to 6 carbon atoms such as methyl, ethyl, propyl, butyl, pentyl and hexyl; straight-chain or branched alkoxyl having 1 to 4 carbon atoms such as methoxy, ethoxy, propoxy and butoxy; alkoxycarbonylalkyl having 3 to 9 carbon atoms such as methoxycarbonylmethyl, ethoxycarbonylmethyl, butoxycarbonylmethyl, methoxycarbonylethyl, ethoxycarbonylethyl, butoxycarbonylethyl, methoxycarbonylbutyl, ethoxycarbonylbutyl and butoxycarbonylbutyl; amino having an alkyl of 1 to 4 carbon atoms as a substituent such as dimethylamino, diethylamino, dipropylamino, dibutylamino and ethylmethylamino. Preferable are straight-chain or branched alkoxyl having 1 to 4 carbon atoms, and amino having an alkyl of 1 to 4 carbon atoms as a substituent. Particularly preferable is straight-chain or branched alkoxyl having 1 to 4 carbon atoms.

A, $Q^1$ and $Q^2$ mentioned above may provide a ring structure. For example, A, $Q^1$ and $Q^2$ may form a phenylene group or phenylene group having or not having a substituent. Examples of useful substituents are alkyl groups having 1 to 4 carbon atoms, such as methyl, ethyl, propyl and butyl; alkoxy groups having 1 to 4 carbon atoms, such as methoxyl, ethoxyl, propoxyl and butoxyl; halogen atoms such as fluorine and chlorine; and alkoxycarbonyl groups having 2 to 5 carbon atoms, such as methoxycarbonyl, ethyoxycarbonyl and butoxycarbonyl. Furthermore, alkylene groups having 1 to 4 carbon atoms can be formed by A and $Q^1$ or by A and $Q^2$.

The preferred additives are those wherein the group represented by A is —CH(X)—, X being an alkoxycarbonyl group having 2 to 5 carbon atoms, and $Q^1$ and $Q^2$ are the same or different and are each a straight-chain or branched chain alkoxy group having 1 to 4 carbon atoms or amino having as a substituent an alkyl group having 1 to 4 carbon atoms. In the case where $Q^1$ and $Q^2$ are the same or different and are each a straight-chain or branched chain alkoxy group having 1 to 4 carbon atoms, three alkoxycarbonyl groups are attached to the carbon having hydrogen at the α-position, whereby the proton at the α-position is given higher acidity to afford an improved alkali inhibiting effect. When one hydrogen atom is present at the α-position, improved voltage resistance is available, hence desirable.

Examples of such additives are dimethyl 1,3-acetonedicarboxylate, diethyl 1,3-acetonedicarboxylate, dimethyl acetylsuccinate, diethyl acetylsuccinate, trimethyl aconitate, triethyl aconitate, 2,6-dimethyl-3,5-heptanedione, N,N,N',N'-tetramethylmalonamide, N,N,N',N'-tetraethylmalonamide, indanedione, trimethylmethanetricarboxylic acid, ethyldimethylmethane-tricarboxylic acid, diethylmethylmethanetricarboxylic acid, methyldiisopropylmethanetricarboxylic acid, triethylmethanetricarboxylic acid, dimethyl benzoylmalonate, diethyl benzoylmalonate, acetylacetone, heptane-3,5-dione, 2,6-dimethylheptane-3,5-dione, 2-acetylcyclopentanone, 1,3-diphenyl-1,3-propanedione, methyl cyclopentanone-2-carboxylate, ethyl cyclopentanone-2-carboxylate, methyl acetoacetate, ethyl acetoacetate, propyl acetoacetate, isopropyl acetoacetate, methyl pivaloylacetate, ethyl pivaloylacetate, methyl 3-oxoheptanoate, methyl 3-oxohexanoate, methyl 3-oxopentanoate, methyl 3-oxobutanoate, methyl 3-oxopropanoate, methyl 3-oxoethanoate, methyl 4-methoxyacetoacetate, dimethyl malonate, diethyl malonate, dimethyl acetonylmalonate, diethyl acetonylmalonate, dimethyl fluoromalonate, diethyl fluoromalonate, dimethyl methylmalonate, dimethyl ethylmalonate, diethyl methylmalonate, diethyl ethylmalonate, etc.

Examples of electrolytes for use in electrolytic solutions of the present invention can be quaternary ammonium salts. Examples of quaternary ammonium cations of such quaternary ammonium salts can be tetraalkylammonium, tetraalkylphosphonium, imidazolium, pyrazolium, pyridinium, triazolium, pyridazinium, thiazolium, oxazolium, pyrimidinium, pyrazinium, etc.

The following compounds are specifically exemplified.

As tetraalkylammonium are tetraethylammonium, tetramethylammonium, tetrapropylammonium, tetrabutylammonium, triethylmethylammonium, trimethylethylammonium, dimethyldiethylammonium, trimethylpropylammonium, trimethylbutylammonium, dimethylethylpropylammonium, methylethylpropylbutylammonium, N,N-dimethylpyrrolidinium, N-ethyl-N-methylpyrrolidinium, N-methyl-N-propylpyrrolidinium, N-ethyl-N-propylpyrrolidinium, N,N-dimethylpiperidinium, N-methyl-N-ethylpiperidinium, N-methyl-N-propylpiperidinium, N-ethyl-N-propylpiperidinium, N,N-dimethylmorpholinium, N-methyl-N-ethylmorpholinium, N-methyl-N-propylmorpholinium, N-ethyl-N-propylmorpholinium, trimethylmethoxyammonium, dimethylethyl-methoxymethylammonium, dimethylpropylmethoxymethylammonium, dimethylbutylmethoxymethylammonium, diethylmethymethoxymethyl-ammonium, methylethylpropylmethoxymethylammonium, triethylmethoxymethylammonium, diethylpropylmethoxymethylammonium, diethylbutylmethoxymethylammonium, dipropylmethylmethoxymethyl-ammonium, dipropylethylmethoxymethylammonium, tripropyl-methoxymethylammonium, tributylmethoxymethylammonium, trimethylethoxymethylammonium, dimethylethylethoxymethylammonium, dimethylpropylethoxymethylammonium, dimethylbutyl-ethoxymethylammonium, diethylmethyl-ethoxymethylammonium, triethylethoxymethylammonium, diethylpropylethoxymethylammonium, diethylbutylethoxymethylammonium, dipropylmethylethoxymethylammonium, dipropylethylethoxymethylammonium, tripropyl-ethoxymethylammonium, tributylethoxymethylammonium, N-methyl-N-methoxymethylpyrrolidinium, N-ethyl-N-methoxymethylpyrrolidinium, N-propyl-N-methoxymethylpyrrolidinium, N-butyl-N-methoxymethylpyrrolidinium, N-methyl-N-ethoxymethylpyrrolidinium, N-methyl-N-propoxymethylpyrrolidinium, N-methyl-N-butoxymethylpyrrolidinium, N-methyl-N-methoxymethylpiperidinium, N-ethyl-N-methoxymethylpyrrolidinium, N-methyl-N-ethoxymethylpyrrolidinium, N-propyl-N-methoxymethylpyrrolidinium, N-methyl-N-propoxymethylpyrrolidinium, 4-azoniaspiro[3,4]octane, 3-azoniaspiro[2,4]heptane, 5-azoniaspiro[5,5]undecane, etc.

As tetraalkylphosphonium are tetraethylphosphonium, tetramethylphosphonium, tetrapropylphosphonium, tetrabutylphosphonium, triethylmethylphosphonium, trimethylethylphosphonium, dimethyldiethylphosphonium, trimethylpropylphosphonium, trimethylbutylphosphonium, dimethylethylpropylphosphonium, methylethylpropylbutylphosphonium, etc.

As imidazolium are 1,3-dimethylimidazolium, 1-ethyl-3-methylimidazolium, 1,3-diethylimidazolium, 1,2-dimethyl-3-ethylimidazolium, 1,2-dimethyl-3-propylimidazolium, etc.

As pyrazolium are 1,2-dimethylpyrazolium, 1-methyl-2-ethylpyrazolium, 1-propyl-2-methypyrazolium, 1-methyl-2-butylpyrazolium, etc.

As pyridinium are N-methylpyridinium, N-ethylpyridinium, N-propylpyridinium, N-butylpyridinium, etc.

As triazolium are 1-methyltriazolium, 1-ethyltriazolium, 1-propyltriazolium, 1-butyltriazolium, etc.

As pyridazinium are 1-methylpyridazinium, 1-ethylpyridazinium, 1-propylpyridazinium, 1-butylpyridazinium, etc.

As thiazolium are 1,2-dimethylthiazolium, 1,2-dimethyl-3-propylthiazolium, etc.

As oxazolium are 1-ethyl-2-methyloxazolium, 1,3-dimethyloxazolium, etc.

As pyrimidinium are 1,2-dimethylpyrimidinium, 1-methyl-3-propylpyrimidinium, etc.

As pyrazinium are 1-ethyl-2-methylpyrazinium, 1-butylpyrazinium, etc.

Examples of anions of quaternary ammonium salts usable in the present invention are $BF_4^-$, $PF_6^-$, $CF_3CO_2^-$, $CF_3SO_3^-$, $N(CF_3SO_2)_2^-$, $N(CF_3CF_2SO_2)_2^-$, $C(CF_3SO_2)_3^-$, $N(CF_3SO_2)(CF_3CO)^-$, $AlF_4^-$, $ClBF_3^-$, $(FSO_2)_2N^-$, $C_2F_5BF_3^-$, $CF_3BF_3^-$, etc.

As required, an organic solvent is usable in the present electrolytic solution.

Although not limitative, the solvents given below are more specific examples of useful solvents.

Examples of cyclic carbonic acid esters are ethylene carbonate, propylene carbonate, butylene carbonate, 4-fluoro-1,3-dioxolan-2-one, 4-(trifluoromethyl)-1,3-dioxolan-2-one, etc. Preferable are ethylene carbonate and propylene carbonate.

Examples of chain carbonic acid esters are dimethyl carbonate, ethylmethyl carbonate, methyl-n-propyl carbonate, methyl-isopropyl carbonate, n-butylmethyl carbonate, diethyl carbonate, ethyl-n-propyl carbonate, ethyl-iso-propyl carbonate, n-butylethyl carbonate, di-n-propyl carbonate, di-iso-propyl carbonate, di-n-butyl carbonate, fluoroethylmethyl carbonate, difluoroethylmethyl carbonate, trifluoroethylmethyl carbonate, etc. Preferable are dimethyl carbonate and ethylmethyl carbonate.

Examples of phosphoric acid esters are trimethyl phosphate, triethyl phosphate, ethyldimethyl phosphate, diethylmethyl phosphate, etc.

Examples of cyclic ethers are tetrahydrofuran, 2-methyltetrahydrofuran, etc.

Examples of chain ethers are dimethoxyethane, etc.

Examples of lactone compounds are gamma-valerolactone, gamma-butyrolactone and the like.

Examples of chain esters are methyl propionate, methyl acetate, ethyl acetate, methyl formate, etc.

Examples of nitrile compounds are acetonitrile and the like.

Examples of amide compounds are dimethylformamide and the like.

Examples of sulfone compounds are sulfolane, methyl sulfolane, etc.

Preferable are cyclic carbonic acid esters, chain carbonic acid esters, lactone compounds and sulfone compounds.

These solvents may be used singly, or at least two of them are usable in admixture.

The additive of the formula (1) is incorporated into the electrolytic solution of the invention in an amount of 0.005 to 90 wt. %, preferably 0.01 to 50 wt. %, more preferably 0.1 to 10 wt. %, based on the solution.

When an organic solvent is used, the electrolytic solution of the invention contains the solvent in an amount of 0.1 to 90 wt. %, preferably 20 to 80 wt. %, more preferably 30 to 70 wt. %, based on the solution.

The electrolytic solution containing the additive of the formula (1) for the solution can be lower in pH value in the event of electrochemical alteration than the electrolytic solution not containing the additive. Further surprisingly, the electrolytic solution containing the additive of the formula (1) for the solution can be improved in voltage resistance over those not containing the additive although the reason still remains to be clarified.

The electrolytic solution of the invention for use in electric double layer capacitors is prepared by the method to be described below. The working environment is not limited particularly insofar as it is prevented from the ingress of atmospheric air since moisture adversely affects the performance of electric double layer capacitors. It is desirable to prepare the solution in a glove box of argon, nitrogen or like inert gas atmosphere. The water content of the working environment is controllable with reference to a dew-point meter; it is desirable to hold the atmosphere at up to minus 60° C. in dew point. If minus 60° C. is exceeded, the electrolytic solution will absorb moisture from the atmosphere to give an increased water content to the solution when the working time becomes prolonged. The electrolytic solution can be checked for water content by a Karl Fischer titrator.

Electric double layer capacitor can be favorably fabricated using the electrolytic solution of the invention thus obtained. Examples of electric double layer capacitor are coin-shaped electric double layer capacitor and laminate type electric double layer capacitor. Electric double layer capacitors are not limited to those of coin shape and those of laminate type. Such a capacitor may be in the form of an assembly of superposed electrodes as placed in a can, or a roll of electrodes as wound up and placed in a can.

A description will be given of the structure of the coin-shaped electric double layer capacitor and laminate type electric double layer capacitor as examples.

FIG. 1 is a diagram showing the coin-shaped electric double layer capacitor in section. Electrodes 1, 2 are arranged as opposed to each other with a separator interposed therebetween, and are housed in container members 4, 5. The electrode comprises a polarizable electrode portion made of a carbon material such as activated carbon, and a current collector portion. The container members 4, 5 need only to be free of corrosion with the electrolytic solution and are made, for example, from stainless steel, aluminum or the like. The container members 4, 5 are electrically insulated with an insulation gasket 6, which also hermetically seals off the interior of a metal container to prevent water and air from ingressing into the interior from outside the container. The current collector of the electrode 1 and the container member 4, as well as the current collector of the electrode 2 and a metal spacer 7, are held in contact with each other under suitable pressure by the presence of a metal spring 8, and are thereby electrically connected. To ensure enhanced electric conductivity, the current collector may be adhered with a carbon paste or like conductive paste.

FIGS. 2 and 3 are drawings showing an electric double layer capacitor of the laminate type. Electrodes 11 are bonded to respective aluminum tabs 9 and are arranged as opposed to each other with a separator 12 interposed therebetween. This assembly is accommodated in a laminate 10. Each electrode comprises a polarizable electrode portion made of active carbon or like carbon material, and a current collector portion. The laminate container 10 is hermetically sealed off by thermal bonding under pressure, preventing moisture and air from ingressing into the container from outside.

The polarizable electrode is made preferably from a material having a great specific surface area and high electric conductivity. The material needs to be electrochemically stable to the electrolytic solution within the range of voltages to be applied for use. Examples of such materials are carbon materials, metal oxide materials, conductive high-molecular-weight materials, etc. In view of the cost, the material for the polarizable electrode is preferably carbon material.

Activated carbon materials are desirable as carbon materials. Examples of such materials are sawdust activated carbon, coconut shell activated carbon, pitch or coke activated carbon, phenolic resin activated carbon, polyacrylonitrile activated carbon, cellulosic activated carbon, etc.

Examples of metal oxide materials usable are ruthenium oxide, manganese oxide, cobalt oxide, etc. Examples of conductive high-molecular-weight materials to be used are polyaniline, polypyrrole film, polythiophene film, poly(3,4-ethylenedioxythiophene) film, etc.

The electrode can be prepared by kneading the polarizable electrode material with PTFE or like binder, molding the mixture under pressure and bonding the resulting piece to a current collector with an electrically conductive binder, or by mixing the polarizable electrode material with a binder and CMC or like thickener, or pyrrolidine or like organic solvent to obtain a paste, coating aluminum foil or like current collector with the paste and the drying the resulting assembly.

Preferably, the separator has high electron insulating properties, is highly wettable with the electrolytic solution and highly permeable to ions, and needs to be electrochemically stable within the range of voltages to be applied. Although the material for the separator is not limited particularly, it is suitable to use paper made from rayon, Manila hemp or the like, porous polyolefin film, nonwoven polyethylene fabric, nonwoven polypropylene fabric, etc.

Figure 1:
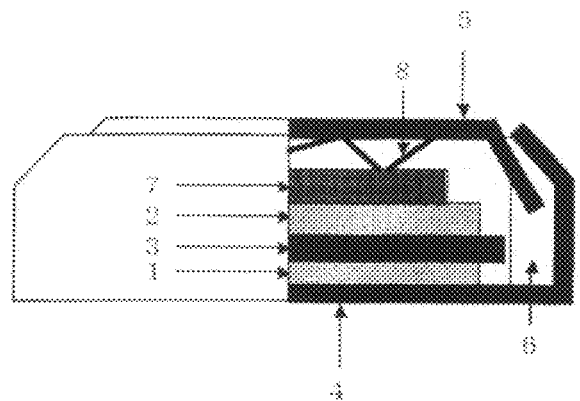
FIG. 1 is a sectional view of a coin-type electrical double layer capacitor of the invention.
Figure 2:
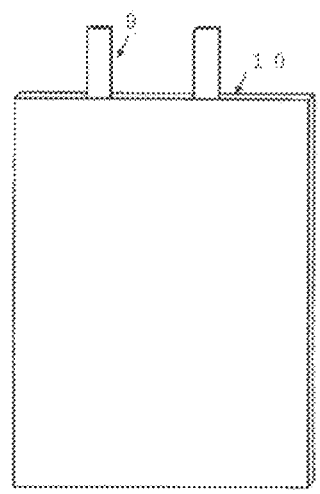
FIG. 2 is a front view showing a laminate-type electric double layer capacitor of the invention.
Figure 3:
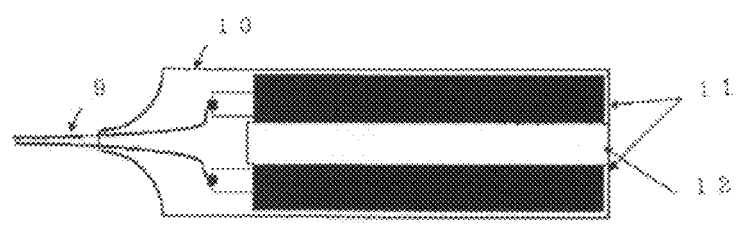
FIG. 3 is a diagram showing the interior structure of the laminate-type electric double layer capacitor of the invention.

1 electrode, 2 electrode, 3 separator, 4 container member, 5 container member, 6 gasket, 7 spacer, 8 spring, 9 aluminum tab, 10 laminate, 11 electrode, 12 separator

BEST MODE OF CARRYING OUT THE INVENTION

The present invention will be described with reference to the following Examples, but is not limited to these examples.

During constant-current electrolysis, the alkalinity of the electrolytic solution is measured in terms of pH value. For the pH measurement of the negative electrode of constant-current electrolysis, electrolysis was conducted at 50 mA using 20 ml of the electrolytic solution as placed in each of a negative electrode chamber and a positive electrode chamber in an H-type cell at room temperature under atmospheric pressure and using platinum plates of 3 cm$^2$ as the electrodes. A pH meter made by HORIBA Co., Ltd. was used for the pH measurement.

The voltage resistance was measured using a 3-electrode electrochemical cell. Used as the working electrode was a glassy carbon electrode (product of BAS Inc.) 1.0 mm in diameter and 0.0079 cm$^{-2}$ in electrode area. The reference electrode used was a silver wire (product of the Nilaco Corp., 99.99% in purity) having a diameter of 0.5 mm. The counter electrode used was a platinum electrode (product of BAS Inc. 11-2233) measuring 0.5 mm in diameter and 50 mm in length.

Linear sweep voltammetry was carried out to determine the potentials giving an oxidizing current density and reducing current density of 1 mAcm$^{-2}$. The difference between the potentials was taken as the voltage resistance. The potential sweep application speed was 50 mVs$^{-1}$. HZ-3000, product of Hokuto Denko Co., Ltd. was used for electrochemical measurement.

Examples 1 to 19

Tetraethylammonium tetrafluoroborate (TEA.BF$_4$, product of Kishida Chemical Co., Ltd., lithium battery grade) and propylene carbonate (PC, product of Kishida Chemical Co., Ltd., lithium battery grade) were mixed together so that the mixture contained the TEA-BF$_4$ at a concentration of 0.75 mol/l.

Next various electrolytic solutions were prepared by incorporating the corresponding additives of Tables 1 and 2 in an amount of 10 wt. % into each of the solutions.

The materials were mixed together within a dry box having an argon atmosphere of −60° C. in dew point. The solution was checked for water content by a Karl Fischer titrator (Hiranuma low water content measuring instrument AQ-7, product of Hiranuma Sangyo Co., Ltd.) to ascertain that the water content was up to 30 ppm.

Each electrolytic solution was checked by measuring the pH on the negative electrode and voltage resistance during constant-current electrolysis. The result is given in Tables 1 and 2.

Examples 20 to 26

Each electrolytic solution was prepared in the same manner as in Example 1 except that triethylmethylammonium tetrafluoroborate (TEMA.BF$_4$, product of Kishida Chemical Co., Ltd.) was used in place of tetraethylammonium tetrafluoroborate (TEA.BF$_4$) and was checked for the pH and voltage resistance. The result is given in Table 2.

Comparative Example 1

An electrolytic solution was prepared in the same manner as in Example 1 without an addition of additive and was checked by measuring the pH on the negative electrode and voltage resistance during constant-current electrolysis. The result is given in Table 2.

Comparative Example 2

An electrolytic solution was prepared in the same manner as in Comparative Example 1 except that ethylmethylimidazolium tetrafluoroborate (EMI.BF$_4$) was used in place of TEA.BF$_4$ and was checked by measuring the pH on the negative electrode and voltage resistance during constant-current electrolysis. The result is given in Table 2.

TABLE 1

|  | additive | Time (min) | | | | | | | voltage resistance (V) |
|---|---|---|---|---|---|---|---|---|---|
|  |  | 0 | 10 | 20 | 30 | 40 | 50 | 60 |  |
| Ex. 1 | dimethyl malonate | 4.6 | 13.5 | 13.4 | 13.6 | 13.6 | 13.6 | 13.6 | 6.0 |
| Ex. 2 | dimethyl 1,3-acetone-dicarboxylate | 5.1 | 9.7 | 11.3 | 11.7 | 11.7 | 11.6 | 11.8 | 4.2 |
| Ex. 3 | dimethyl acetylsuccinate | 3.9 | 12.8 | 12.7 | 13.3 | 13.5 | 13.3 | 13.8 | 4.7 |
| Ex. 4 | dimethyl fluoromalonate | 7.1 | 14.0 | 14.8 | 14.4 | 14.0 | 13.9 | 13.9 | 6.2 |
| Ex. 5 | dimethyl acetonylmalonate | 4.7 | 14.2 | 14.6 | 14.3 | 14.2 | 14.2 | 14.1 | 6.1 |
| Ex. 6 | dimethyl methylmalonate | 7.4 | 14.1 | 14.2 | 14.3 | 14.1 | 14.2 | 14.6 | 6.4 |
| Ex. 7 | diethyl acetonylmalonate | 6.4 | 14.1 | 13.8 | 13.9 | 13.8 | 13.8 | 13.6 | 6.3 |
| Ex. 8 | diethyl 1,3-acetone-dicarboxylate | 5.1 | 9.7 | 11.3 | 11.7 | 11.7 | 11.6 | 11.8 | 4.4 |
| Ex. 9 | trimethyl trans-aconitate | 4.7 | 10.7 | 11.1 | 11.2 | 11.3 | 11.3 | 11.0 | 5.3 |
| Ex. 10 | 2,6-dimethyl-3,5-heptanedione | 3.2 | 13.2 | 13.9 | 13.0 | 13.2 | 12.3 | 11.8 | 4.2 |

TABLE 1-continued

|  | additive | Time (min) | | | | | | | voltage resistance (V) |
|---|---|---|---|---|---|---|---|---|---|
|  |  | 0 | 10 | 20 | 30 | 40 | 50 | 60 |  |
| Ex. 11 | N,N,N',N'-tetramethyl-malonamide | 7.7 | 15.4 | 15.8 | 15.0 | 14.1 | 13.9 | 13.1 | 7.2 |
| Ex. 12 | indanedione | 3.4 | 6.6 | 8.8 | 9.1 | 9.2 | 9.4 | 9.4 | 5.4 |
| Ex. 13 | triethylmethane-tricarboxylic acid | 5.3 | 11.3 | 11.6 | 11.7 | 11.8 | 11.9 | 11.9 | 7.3 |
| Ex. 14 | dimethyl benzoylmalonate | 4.5 | 9.1 | 10.1 | 10.4 | 10.5 | 10.6 | 10.6 | 4.6 |

TABLE 2

|  | additive | Time (min) | | | | | | | voltage resistance (V) |
|---|---|---|---|---|---|---|---|---|---|
|  |  | 0 | 10 | 20 | 30 | 40 | 50 | 60 |  |
| Ex. 15 | acetylacetone | 5.0 | 13.1 | 13.2 | 13.3 | 13.4 | 13.5 | 13.8 | 3.5 |
| Ex. 16 | 2-acetyl-cyclopentanone | 4.5 | 11.1 | 11.4 | 11.6 | 11.7 | 11.8 | 11.9 | 3.3 |
| Ex. 17 | methyl acetoacetate | 7.2 | 13.1 | 13.8 | 13.9 | 14.0 | 14.0 | 13.7 | 4.7 |
| Ex. 18 | methyl pivaloylacetate | 3.6 | 14.2 | 14.3 | 14.2 | 14.2 | 14.3 | 14.1 | 4.4 |
| Ex. 19 | methyl 3-keto-n-hexanoate | 4.0 | 14.1 | 14.6 | 14.5 | 14.2 | 14.2 | 14.1 | 4.9 |
| Ex. 20 | 1,3-diphenyl-1,3-propanedione | 4.0 | 12.2 | 13.2 | 12.4 | 13.5 | 13.2 | 13.3 | 2.9 |
| Ex. 21 | methyl 3-oxoheptanoate | 2.9 | 13.8 | 14.3 | 13.2 | 14.4 | 14.5 | 14.4 | 5.0 |
| Ex. 22 | methyl 4-methoxy-acetoacetate | 3.8 | 12.3 | 12.7 | 12.8 | 12.8 | 12.9 | 12.8 | 4.4 |
| Ex. 23 | trimethylmethane-tricarboxylic acid | 5.6 | 11.8 | 12.1 | 12.2 | 12.2 | 12.2 | 12.3 | 7.1 |
| Ex. 24 | ethyldimethyl-methane-tricarboxylic acid | 5.3 | 11.6 | 12.0 | 12.0 | 12.1 | 12.1 | 12.1 | 7.2 |
| Ex. 25 | diethylmethyl-methane-tricarboxylic acid | 5.3 | 11.5 | 11.8 | 11.8 | 11.9 | 12.0 | 12.0 | 7.2 |
| Ex. 26 | methyldiisopropyl-methane-tricarboxylic acid | 6.5 | 12.5 | 12.7 | 12.7 | 12.8 | 12.8 | 12.9 | 7.3 |
| Com. Ex. 1 | — | 3.9 | 15.8 | 16< | 16< | 16< | 16< | 16< | 7.0 |
| Com. Ex. 2 | — | 9.4 | 13.4 | 14.1 | 14.1 | 14.2 | 14.0 | 13.6 | 4.7 |

Example 27

An electrolytic solution was prepared by mixing 30 parts by weight of N-methoxymethyl-N-methylpyrrolidinium tetrafluoroborate (MMMP.BF$_4$) (Otsuka Chemical Co., Ltd.), 60 parts by weight of propylene carbonate (PC) (same as above) and 10 parts by weight of triethylmethanetricarboxylic acid (Kanto Chemical Co., Inc., purified by distillation).

The materials were mixed together within a dry box having an argon atmosphere of −60° C. in dew point. The solution was checked for water content by a Karl Fischer titrator (same as above) to ascertain that the water content was up to 30 ppm.

The electrolytic solution was checked by measuring the pH on the negative electrode and voltage resistance during constant-current electrolysis. The result is given in Table 3.

Example 28

An electrolytic solution was prepared in the same manner as in Example 27 except that 30 parts by weight of MMMP.BF$_4$, 65 parts by weight of (PC) (same as above) and 5 parts by weight of triethylmethanetricarboxylic acid (same as above) were used. The electrolytic solution was checked by measuring the pH on the negative electrode and voltage resistance during constant-current electrolysis. The result is given in Table 3.

Example 29

An electrolytic solution was prepared in the same manner as in Example 27 except that 30 parts by weight of MMMP.BF$_4$, 68 parts by weight of (PC) (same as above) and 2 parts by weight of triethylmethanetricarboxylic acid (same as above) were used. The electrolytic solution was checked by measuring the pH on the negative electrode and voltage resistance during constant-current electrolysis. The result is given in Table 3.

Example 30

An electrolytic solution was prepared in the same manner as in Example 27 except that 30 parts by weight of MMMP.BF$_4$, 69 parts by weight of (PC) (same as above) and 1 part by weight of triethylmethanetricarboxylic acid (same as above) were used. The electrolytic solution was checked by measuring the pH on the negative electrode and voltage resistance during constant-current electrolysis. The result is given in Table 3.

Example 31

An electrolytic solution was prepared in the same manner as in Example 27 except that 30 parts by weight of MMMP.BF$_4$, 69.5 parts by weight of (PC) (same as above) and 0.5 part by weight of triethylmethanetricarboxylic acid (same as above) were used. The electrolytic solution was checked by measuring the pH on the negative electrode and voltage resistance during constant-current electrolysis. The result is given in Table 3.

Example 32

An electrolytic solution was prepared in the same manner as in Example 27 except that 30 parts by weight of N-methyl-N-propylpyrrolidinium tetrafluoroborate (MPP.BF$_4$), 69.5 parts by weight of (PC) (same as above) and 0.5 part by weight of triethylmethanetricarboxylic acid (same as above) were used. The electrolytic solution was checked by measuring the pH on the negative electrode and voltage resistance during constant-current electrolysis. The result is given in Table 3.

Example 33

An electrolytic solution was prepared in the same manner as in Example 27 except that 30 parts by weight of N-ethyl-N-methylpyrrolidinium tetrafluoroborate (MEP.BF$_4$), 69.0 parts by weight of (PC) (same as above) and 1.0 part by weight of trimethylmethanetricarboxylic acid (Kanto Chemical Co., Inc., purified by distillation) were used. The electrolytic solution was checked by measuring the pH on the negative electrode and voltage resistance during constant-current electrolysis. The result is given in Table 3.

Example 34

An electrolytic solution was prepared in the same manner as in Example 27 except that 30 parts by weight of 5-azoniaspiro[4,4]nonane (ASN.BF$_4$), 68.0 parts by weight of (PC) (same as above) and 2.0 parts by weight of trimethylmethanetricarboxylic acid (same as above) were used. The electrolytic solution was checked by measuring the pH on the negative electrode and voltage resistance during constant-current electrolysis. The result is given in Table 3.

Comparative Example 3

An electrolytic solution was prepared in the same manner as in Example 27 except that 70 parts by weight of PC (same as above) and 0 part by weight of triethylmethanetricarboxylic acid (same as above) were used. The electrolytic solution was checked by measuring the pH on the negative electrode and voltage resistance during constant-current electrolysis. The result is given in Table 3.

TABLE 3

| | additive | Time (min) | | | | | | | voltage resistance (V) |
|---|---|---|---|---|---|---|---|---|---|
| | | 0 | 10 | 20 | 30 | 40 | 50 | 60 | |
| Ex. 27 | triethylmethane-tricarboxylic acid (10) | 5.8 | 10.9 | 11.3 | 11.5 | 11.6 | 11.7 | 11.8 | 6.7 |
| Ex. 28 | triethylmethane-tricarboxylic acid (5) | 6.3 | 11.1 | 11.6 | 11.8 | 12.0 | 12.0 | 12.1 | 6.7 |
| Ex. 29 | triethylmethane-tricarboxylic acid (2) | 7.1 | 11.4 | 11.8 | 12.0 | 12.5 | 12.5 | 12.7 | 6.8 |
| Ex. 30 | triethylmethane-tricarboxylic acid (1) | 5.6 | 11.9 | 12.6 | 12.6 | 12.9 | 13.0 | 13.1 | 6.8 |
| Ex. 31 | triethylmethane-tricarboxylic acid (0.5) | 5.8 | 12.1 | 13.4 | 13.7 | 13.8 | 14.2 | 14.3 | 7.1 |
| Ex. 32 | triethylmethane-tricarboxylic acid (0.5) | 5.7 | 12.2 | 13.5 | 13.7 | 13.8 | 14.3 | 14.4 | 7.0 |
| Ex. 33 | trimethylmethane-tricarboxylic acid (1.0) | 5.5 | 11.7 | 12.8 | 12.9 | 12.9 | 13.2 | 13.1 | 6.9 |
| Ex. 34 | trimethylmethane-tricarboxylic acid (2.0) | 5.8 | 11.4 | 11.9 | 12.3 | 12.5 | 12.5 | 12.8 | 6.8 |
| Com. Ex. 3 | — | 5.0 | 15.5 | 15.8 | 16.0 | 15.7 | 15.6 | 15.6 | 6.6 |

Example 35

An electrolytic solution was prepared by mixing 75 parts by weight of N-methoxymethyl-N-methylpyrrolidinium tetrafluoroborate (MMMP.BF$_4$) (same as above) and 25 parts by weight of triethylmethanetricarboxylic acid (same as above).

The materials were mixed together within a dry box having an argon atmosphere of −60° C. in dew point. The solution was checked for water content by a Karl Fischer titrator (same as above) to ascertain that the water content was up to 30 ppm.

The electrolytic solution was checked by measuring the pH on the negative electrode and voltage resistance during constant-current electrolysis. The result is given in Table 4.

Example 36

An electrolytic solution was prepared by mixing 60 parts by weight of N-methoxymethyl-N-methylpyrrolidinium tetrafluoroborate (MMMP.BF$_4$) (same as above), 20 parts by weight of dimethyl carbonate (DMC, product of Kishida Chemical Co., Ltd., lithium battery grade), 19 parts by weight of ethylmethyl carbonate (EMC, product of Kishida Chemical Co., Ltd., lithium battery grade) and 1 part by weight of triethylmethanetricarboxylic acid (same as above).

The materials were mixed together within a dry box having an argon atmosphere of −60° C. in dew point. The solution was checked for water content by a Karl Fischer titrator (same as above) to ascertain that the water content was up to 30 ppm.

The electrolytic solution was checked by measuring the pH on the negative electrode and voltage resistance during constant-current electrolysis. The result is given in Table 4.

Comparative Example 4

An electrolytic solution was prepared in the same manner as in Example 36 except that 20 parts by weight of EMC (same as above) and 0 part by weight of triethylmethanetricarboxylic acid (same as above) were used. The electrolytic solution was checked by measuring the pH on the negative electrode and voltage resistance during constant-current electrolysis. The result is given in Table 4.

TABLE 4

| | additive | \multicolumn{7}{c}{Time (min)} | voltage resistance (V) |
| | | 0 | 10 | 20 | 30 | 40 | 50 | 60 | |
|---|---|---|---|---|---|---|---|---|---|
| Ex. 35 | triethylmethane-tricarboxylic acid (25) | 5.9 | 8.8 | 9.8 | 10.6 | 10.2 | 10.2 | 10.4 | 6.6 |
| Ex. 36 | triethylmethane-tricarboxylic acid (1) | 6.8 | 10.0 | 11.0 | 11.5 | 11.8 | 12.1 | 12.2 | 6.5 |
| Com. Ex. 4 | — | 7.3 | 15.8 | 16< | 16< | 16< | 16< | 16< | 6.6 |

[Preparation of Electrolytic Solutions for Electrical Double Layer Capacitor]

Examples 37 to 43 and Comparative Examples 5 and 6

Various electrolytic solutions were prepared by mixing MMMP.BF$_4$ (same as above) as an electrolyte, PC (same as above) as an organic solvent and various additives in amounts as listed in Table 5.

The materials were mixed together within a dry box having an argon atmosphere of −60° C. in dew point. The solution was checked for water content by a Karl Fischer titrator (same as above) to ascertain that the water content was up to 30 ppm.

TABLE 5

| | electrolyte (wt %) | organic solvent (wt %) | additive | additive (wt %) |
|---|---|---|---|---|
| Ex. 37 | 40.0 | 59.5 | triethylmethane-tricarboxylic acid | 0.5 |
| Ex. 38 | 40.0 | 59.0 | triethylmethane-tricarboxylic acid | 1.0 |
| Ex. 39 | 26.3 | 73.2 | triethylmethane-tricarboxylic acid | 0.5 |
| Ex. 40 | 26.3 | 73.2 | trimethylmethane-tricarboxylic acid | 0.5 |
| Ex. 41 | 26.3 | 73.2 | ethyldimethylmethane-tricarboxylic acid | 0.5 |
| Ex. 42 | 26.3 | 73.2 | diethylmethylmethane-tricarboxylic acid | 0.5 |
| Ex. 43 | 26.3 | 73.2 | methyldiisopropylmethane-tricarboxylic acid | 0.5 |
| Com. Ex. 5 | 40.0 | 60.0 | — | — |
| Com. Ex. 6 | 26.3 | 73.7 | — | — |

[Fabrication of Coin-Type Electrical Double Layer Capacitor]

Examples 44 to 45 and Comparative Example 7

A coin-type electric double-layer capacitor 1 having the construction of FIG. 1 was fabricated using the above electrolytic solution. Electrodes 1, 2 were made by kneading a conductive substance consisting mainly of activated carbon, binder and N-methylpyrrolidone to prepare a paste, coating aluminum foil with the paste to a thickness of 150 μm, thereafter drying the coating to obtain an electrode sheet and cutting out disks from the sheet. A container 1, container 2, spacer and spring were made of stainless steel, and a separator was made of a nonwoven polypropylene fabric. The capacitor was fabricated inside a glove box filled with argon gas. The electrodes 1, 2, containers 1, 2, spring and spacer were dried in a vacuum with heating at 120° C. for 24 hours and thereafter brought into the glove box. The electrodes 1, 2 and separator were impregnated with the above electrolytic solution for use in capacitors of the type mentioned, and the containers 1, 2 were crimped with a gasket provided therebetween to obtain the coin-type capacitor of the construction shown in FIG. 1.

[Measurement of Leak Electric Current Value]

The coin-shaped electric double-layer capacitors fabricated using the electrolytic solutions obtained in Examples 37 to 38 and Comparative Example 5 were checked for leak electric current value in a constant-temperature vessel at 25° C. A coin-shaped cell was set in a holder specific thereto and thereafter the capacitor was brought into a charge-discharge operation. The capacitor was charged with constant current at a current density of 5.0 mAcm$^{-2}$, the constant-current charging was changed over to constant-voltage charging upon the voltage reaching 2.4 V, and the capacitor was held at 2.4 V for 120 minutes, followed by constant-current charging at 5.0 mAcm$^{-2}$. Upon the voltage dropping to 0.1 V, the charging was changed over to constant-voltage discharging, and the capacitor was held at 0.1 V for 120 minutes.

Thereafter, the same cycle as above was repeated twice with constant-voltage charging at 2.6 V, 2.8 V, 3.0 V and 3.2 V, respectively. An electric current 120 minutes after the constant-voltage charging was measured as a leak electric current value. Table 6 shows the results.

TABLE 6

|  | electrolytic solution | leak electric current (mA) | | | | |
| --- | --- | --- | --- | --- | --- | --- |
|  |  | 2.4 V | 2.6 V | 2.8 V | 3.0 V | 3.2 V |
| Ex. 44 | Ex. 37 | 0.367 | 0.417 | 0.451 | 0.487 | 0.529 |
| Ex. 45 | Ex. 38 | 0.231 | 0.241 | 0.241 | 0.260 | 0.285 |
| Com. Ex. 7 | Com. Ex. 5 | 0.552 | 0.613 | 0.652 | 0.640 | 0.680 |

[Fabrication of Laminate-Type Electric Double Layer Capacitor]

Examples 46 to 69 and Comparative Examples 8 to 11

Using the electrolytic solution, laminate-type electric double layer capacitors were fabricated which had laminate-type electrodes, cellulose-type separator and which were 2.5 V or 2.7 V in rated voltage and 10° F. or 60° F. in capacitance.

[Preparation of Electrodes]

To prepare polarizable electrodes, rolls were used for kneading 80 wt. % of activated carbon powder, 10 wt. % of acetylene black and 10 wt. % of polytetrafluoroethylene powder. The mixture was thereafter made into a 0.1-mm-thick sheet, which was bonded to an etched aluminum sheet with carbon paste or like electrically conductive paste to obtain an electrode sheet. Laminate-type electrodes were blanked out from this sheet with a die.

[Method of Evaluation]

For a durability test, the capacitor was subjected to aging treatment within a constant-temperature chamber set at 25° C. by charging the capacitor at a constant voltage of 2.5 V or 2.7 V for 24 hours and discharged to 0.0 V. The capacitor was thereafter allowed to stand at a specified temperature for several hours, charged again at a constant voltage for 30 minutes and discharged to a predetermined voltage at a rate of 2.0 mA/cm$^2$. The capacitance and internal resistance were determined by the voltage gradient. Subsequently, the capacitor was subjected to a floating test at a constant voltage at 60° C. for 500 hours, and the capacitance and internal resistance were determined by the same method as above to calculate the retentivity. Table 7 shows the result.

TABLE 7

|  | voltage | capacitance | electrolytic solution | capacitance retentivity | resistance retentivity |
| --- | --- | --- | --- | --- | --- |
| Ex. 46 | 2.5 V | 10 F | Ex. 38 | 88% | 106% |
| Ex. 47 |  |  | Ex. 39 | 89% | 106% |
| Ex. 48 |  |  | Ex. 40 | 88% | 106% |
| Ex. 49 |  |  | Ex. 41 | 89% | 106% |
| Ex. 50 |  |  | Ex. 42 | 88% | 106% |
| Ex. 51 |  |  | Ex. 43 | 88% | 106% |
| Com. Ex. 8 |  |  | Com. Ex. 6 | 86% | 108% |
| Ex. 52 | 2.5 V | 60 F | Ex. 38 | 88% | 113% |
| Ex. 53 |  |  | Ex. 39 | 89% | 112% |
| Ex. 54 |  |  | Ex. 40 | 86% | 114% |
| Ex. 55 |  |  | Ex. 41 | 88% | 113% |
| Ex. 56 |  |  | Ex. 42 | 88% | 112% |
| Ex. 57 |  |  | Ex. 43 | 87% | 113% |
| Com. Ex. 9 |  |  | Com. Ex. 6 | 84% | 120% |
| Ex. 58 | 2.7 V | 10 F | Ex. 38 | 75% | 151% |
| Ex. 59 |  |  | Ex. 39 | 75% | 153% |
| Ex. 60 |  |  | Ex. 40 | 74% | 148% |
| Ex. 61 |  |  | Ex. 41 | 75% | 152% |
| Ex. 62 |  |  | Ex. 42 | 76% | 151% |
| Ex. 63 |  |  | Ex. 43 | 76% | 150% |
| Com. Ex. 10 |  |  | Com. Ex. 6 | 71% | 167% |
| Ex. 64 | 2.7 V | 60 F | Ex. 38 | 68% | 200% |
| Ex. 65 |  |  | Ex. 39 | 68% | 198% |
| Ex. 66 |  |  | Ex. 40 | 69% | 200% |
| Ex. 67 |  |  | Ex. 41 | 68% | 203% |
| Ex. 68 |  |  | Ex. 42 | 68% | 201% |
| Ex. 69 |  |  | Ex. 43 | 69% | 119% |
| Com. Ex. 11 |  |  | Com. Ex. 6 | 65% | 213% |

INDUSTRIAL APPLICABILITY

The present electrolytic solutions suppress the formation of OH ions even in the event of electrochemical alteration to diminish the degradation or corrosion of resins, rubbers or metals and to give improved reliability to electrochemical devices. Accordingly, electrochemical devices using the present electrolytic solutions have improved reliability.

The invention claimed is:
1. An electric double layer capacitor comprising,
an electrolytic solution comprising an electrolyte and an additive,
wherein the additive is dimethyl 1,3-acetone-dicarboxylate, diethyl 1,3-acetonedicarboxylate, indanedione, trimethyl aconitate, triethylmethanetricarboxylic acid, ethyldimethylmethanetricarboxylic acid, diethylmethylmethane-tricarboxylic acid, methyldiisopropylmethanetricarboxylic acid, trimethylmethanetricarboxylic acid, N,N,N',N'-tetramethylmalonamide, N,N,N',N'-tetraethylmalonamide, methyl 3-oxoheptanoate, methyl 3-oxopentanoate or methyl cyclopentanone-2-carboxylate.

* * * * *